(12) United States Patent
McDonald

(10) Patent No.: US 6,709,184 B1
(45) Date of Patent: Mar. 23, 2004

(54) APPARATUS FOR MOUNTING A RECEIVER MAST AND ASSOCIATED METHOD

(75) Inventor: Timothy J. McDonald, Maitland, FL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 09/467,574

(22) Filed: Dec. 20, 1999

(51) Int. Cl.[7] .............................................. F16C 11/00
(52) U.S. Cl. ...................... 403/98; 403/110; 343/882; 343/888; 343/892; 248/222.51; 248/299.1
(58) Field of Search ........................... 248/282.1, 299.1, 248/230.1, 222.51; 403/98, 110, 112, 188, 386, 13; 343/874, 888, 892, 882

(56) References Cited

U.S. PATENT DOCUMENTS

| | | | | |
|---|---|---|---|---|
| 110,434 | A | * 12/1870 | Clarke ........................ 248/515 |
| 780,947 | A | * 1/1905 | Grabe ........................ 403/386 |
| 1,303,429 | A | * 5/1919 | Brown ........................ 248/70 |
| 1,522,751 | A | * 1/1925 | Sechler .................... 403/386 X |
| 1,935,246 | A | * 11/1933 | Kirsch ................. 248/299.1 X |
| 2,463,176 | A | * 3/1949 | Hogrefe ...................... 248/682 |
| 2,575,917 | A | * 11/1951 | Johnson ........................ 403/98 |
| 2,611,566 | A | * 9/1952 | Landis ........................ 248/536 |
| 2,614,861 | A | * 10/1952 | Horn ................... 248/299.1 X |
| 2,667,317 | A | * 1/1954 | Trebules ...................... 248/514 |
| 2,754,156 | A | * 7/1956 | Elderkin ...................... 403/98 |
| 3,910,561 | A | * 10/1975 | Fornells ................. 403/386 X |
| 3,941,340 | A | * 3/1976 | Rankins .................... 403/98 X |
| 4,126,865 | A | | 11/1978 | Longhurst et al. |
| 4,495,706 | A | | 1/1985 | Kaminski |
| 4,626,864 | A | | 12/1986 | Micklethwaite |
| 4,726,259 | A | | 2/1988 | Idler |
| 4,833,932 | A | | 5/1989 | Rogers |
| 4,928,914 | A | * | 5/1990 | Snodell ...................... 248/274 |
| 5,065,969 | A | | 11/1991 | McLean |
| 5,088,672 | A | * | 2/1992 | Neuendorf et al. ..... 403/386 X |
| 5,276,972 | A | | 1/1994 | Staney |
| 5,285,938 | A | * | 2/1994 | Fauchald ............. 224/42.45 R |
| 5,351,060 | A | | 9/1994 | Bayne |
| 5,469,182 | A | | 11/1995 | Chaffee |
| 5,473,335 | A | | 12/1995 | Tines |
| 5,646,638 | A | | 7/1997 | Winegard et al. |
| 5,647,134 | A | | 7/1997 | Chou |
| 5,657,031 | A | | 8/1997 | Anderson et al. |
| 5,664,752 | A | * | 9/1997 | Matthiessen et al. .... 248/299.1 |
| 5,734,356 | A | | 3/1998 | Chang |
| 5,829,121 | A | | 11/1998 | Shoemaker et al. |
| 5,870,059 | A | | 2/1999 | Reynolds |
| 5,894,674 | A | | 4/1999 | Feldman |
| 5,903,237 | A | | 5/1999 | Crosby et al. |
| 5,920,291 | A | * | 7/1999 | Bosley ........................ 343/892 |
| 5,933,123 | A | | 8/1999 | Kaul |
| D413,603 | S | * | 9/1999 | Inoue ..................... 343/882 X |
| 5,963,179 | A | * | 10/1999 | Chavez ........................ 343/892 |
| 5,977,922 | A | | 11/1999 | Hemmingsen, II |

(List continued on next page.)

OTHER PUBLICATIONS

U.S. patent application Ser. No. 10/008,424, Saunders et al., filed Nov. 2001.

(List continued on next page.)

Primary Examiner—Lynne H. Browne
Assistant Examiner—Michael P. Ferguson
(74) Attorney, Agent, or Firm—Kirkpatrick & Lockhart LLP

(57) ABSTRACT

An apparatus for mounting a receiver mast to a structure. The apparatus includes a structure attachment plate, a releasable attachment member, a movable plate releasably attached to the structure attachment plate by the releasable attachment member for movement with respect to the structure attachment plate and a mast fastener for affixing the receiver mast to the movable plate. A leg member may be provided for attaching the structure attachment plate to the structure. A method for mounting a receiver mast to a structure is also disclosed. An assembly mounted to a structure for receiving a signal is also disclosed.

20 Claims, 5 Drawing Sheets

U.S. PATENT DOCUMENTS

| | | | |
|---|---|---|---|
| 5,992,809 A | | 11/1999 | Sweere et al. |
| 5,999,139 A | | 12/1999 | Benjamin et al. |
| 6,008,769 A | | 12/1999 | Palmiter et al. |
| 6,023,247 A | | 2/2000 | Rodeffer |
| 6,031,508 A | * | 2/2000 | Ishizuka et al. ............ 343/882 |
| 6,037,913 A | | 3/2000 | Johnson |
| 6,045,103 A | * | 4/2000 | Costa et al. ............. 248/278.1 |
| 6,188,372 B1 | | 2/2001 | Jackson et al. |
| 6,201,512 B1 | * | 3/2001 | Wu ........................... 343/882 |
| 6,208,314 B1 | | 3/2001 | Bourquin |
| D453,151 S | | 1/2002 | Weaver |
| D453,330 S | | 2/2002 | Weaver |
| 6,480,161 B2 | | 11/2002 | Watson |
| 6,484,987 B2 | | 11/2002 | Weaver |
| 6,486,851 B2 | | 11/2002 | Weaver |
| 6,507,325 B2 | | 1/2003 | Matz et al. |
| 6,559,806 B1 | | 5/2003 | Watson |
| 2002/0083573 A1 | | 7/2002 | Matz et al. |
| 2002/0083574 A1 | | 7/2002 | Matz et al. |
| 2002/0084941 A1 | | 7/2002 | Matz et al. |

OTHER PUBLICATIONS

U.S. patent application Ser. No. 10/014,284, Matz et al., filed Dec. 2001.

U.S. patent application Ser. No. 10/302,023, Matz et al., filed Nov. 2002.

U.S. patent application Ser. No. 10/350,655, Watson, filed Jan. 2003.

U.S. patent application Ser. No. 10/364,099, Matz et al., filed Feb. 2003.

* cited by examiner

APPARATUS FOR MOUNTING A RECEIVER MAST AND ASSOCIATED METHOD

CROSS-REFERENCE TO RELATED APPLICATIONS

Not applicable.

FEDERALLY SPONSORED RESEARCH

Not applicable.

BACKGROUND OF THE INVENTION

FIELD OF THE INVENTION

The subject invention relates to mounting apparatuses, and more particularly, to an apparatus and associated method for mounting a receiver mast to a structure.

DESCRIPTION OF THE INVENTION BACKGROUND

A receiver, such as an antenna or a satellite dish, is a device used to send or receive electromagnetic waves or signals forming telecommunications, radio, television, and other signals. Receiver assemblies typically include the receiver mounted to a pole or mast that is oriented in an elevated position above ground level to improve the receiver's line-of-sight range.

The receiver mast may be mounted to a variety of different elevated structures such as buildings, poles, towers, trees, etc. to improve the receiver's line-of-sight. To optimize the receiver's reception and transmissibility such that a clear signal is received or sent, the receiver must be precisely positioned or tuned. Tuning involves the manipulation and alignment of the receiver to a desired position. For example, it is often desirable to mount the receiver such that it is oriented along a true vertical or plumb line. In such installations, if the receiver is not mounted in a true vertical orientation, signal quality may be sacrificed.

Existing receiver mounting apparatuses commonly comprise a rigid bracket that has a mast clamping portion. Such mounting brackets are typically not adjustable and therefore are not well-suited for affixing the receiver mast to a structure that lacks a vertically oriented surface. For example, existing receiver mounting devices are difficult to employ when it is desirable to mount the receiver mast to an arcuate tree limb or other structure that lacks a vertically oriented surface.

Thus there is a need for a receiver mounting apparatus that can be used to mount a receiver to a variety of different structures, such as elevated buildings, trees, etc.

There is a further need for a receiver mounting apparatus that can be easily adjusted during installation to align the receiver in a desired orientation.

Another need exists for a receiver mounting apparatus that can be easily used to affix a receiver mast to a tree limb or other structure that does not have a vertically oriented surface.

There is still another need for a receiver mounting apparatus that has the above-mentioned characteristics and that is easy to manufacture and install.

Yet another need exists for a receiver mounting apparatus that is manufactured from corrosion resistant materials.

Another need exists for a receiver mounting apparatus that has the above-mentioned characteristics that can be easily installed and adjusted with common hand tools.

Still another need exists for a device for mounting an object to a structure that is readily adjustable such that the object may be supported in a desired orientation relative to the structure.

SUMMARY OF THE INVENTION

The present invention meets the above-described needs, as well as other needs, by providing an improved apparatus for mounting a receiver mast to a structure. The apparatus comprises a structure attachment plate for being mounted to the structure. A movable plate is releasably attached to the structure attachment plate by a releasable attachment member to provide for movement of the movable plate with respect to the structure attachment plate. The apparatus also includes a mast fastener for affixing the receiver mast to the movable plate. It will be appreciated that by affixing the mast fastener to the movable plate, the positioning or orientation of the receiver mast may be adjusted.

The present invention also provides for an assembly mounted to a structure for receiving a signal where the assembly comprises a receiver to receive the signal, an elongated mast having one end attached to the receiver and a mounting apparatus for attaching to another end of the elongated mast. The mounting apparatus includes a structure attachment plate, a movable plate releasably attached to the structure attachment plate by a releasable attachment member for movement with respect to the structure attachment plate and a mast fastener for affixing the antenna mast to the movable plate.

The mounting apparatus of the subject invention may be fabricated from bendable materials that permit various components of the subject mounting apparatuses to conform to the shape and size of the particular structure or member to which it is to be mounted. For outdoor applications, the mounting apparatuses may be fabricated from corrosion-resistant materials. Other embodiments of the subject invention employ fasteners that are easily adjusted by common hand tools. If desired, all of the fasteners employed by the subject invention may be of a common size such that a single hand tool could be used to complete the adjustments and installation of the apparatus. Multiple apparatuses may be advantageously used to support elongated masts and other objects.

An associated method for mounting a receiver mast to a structure comprises the steps of attaching a mounting apparatus having a stationary plate and a movable plate to the structure, securing the receiver mast to the movable plate of the mounting apparatus and adjusting the movable plate to adjust the orientation of the receiver mast.

Thus, the subject invention represents a vast improvement over prior receiver mounting devices. Moreover, the unique and novel aspects of the mounting apparatus of the subject invention make it particularly well-suited for attaching a variety of differently shaped objects to a structure or other member.

It is a feature of the present invention to provide a receiver mounting apparatus that can be used to mount a receiver to a variety of different structures, such as elevated buildings, trees, etc.

It is another feature of the subject invention to provide a receiver mounting apparatus that can be easily adjusted during installation to align the receiver in a desired orientation.

Yet another feature of the subject invention is to provide a receiver mounting apparatus that can be easily used to affix a receiver mast to a tree limb or other structure that does not have a vertically oriented surface.

Another feature of the subject invention is to provide a receiver mounting apparatus that has the above-mentioned characteristics and that is easy to manufacture and install.

Still another feature of the subject invention is to provide a receiver mounting apparatus that is manufactured from corrosion resistant materials.

Another feature of the subject invention is to provide a receiver mounting apparatus that has the above-mentioned characteristics that can be easily installed and adjusted with common hand tools.

It is another feature of the subject invention to provide a device for mounting an object to a structure that is readily adjustable such that the object may be supported in a desired orientation relative to the structure.

Those of ordinary skill in the art will readily appreciate that these and other details, features and advantages of the invention will be more fully understood from the description of the invention on reference to the illustrations appended hereto.

BRIEF DESCRIPTION OF THE DRAWINGS

In the accompanying drawings, there are shown embodiments of the present invention wherein like reference numbers are employed to designate like parts and wherein.

DETAILED DESCRIPTION OF THE INVENTION

Figure 1:
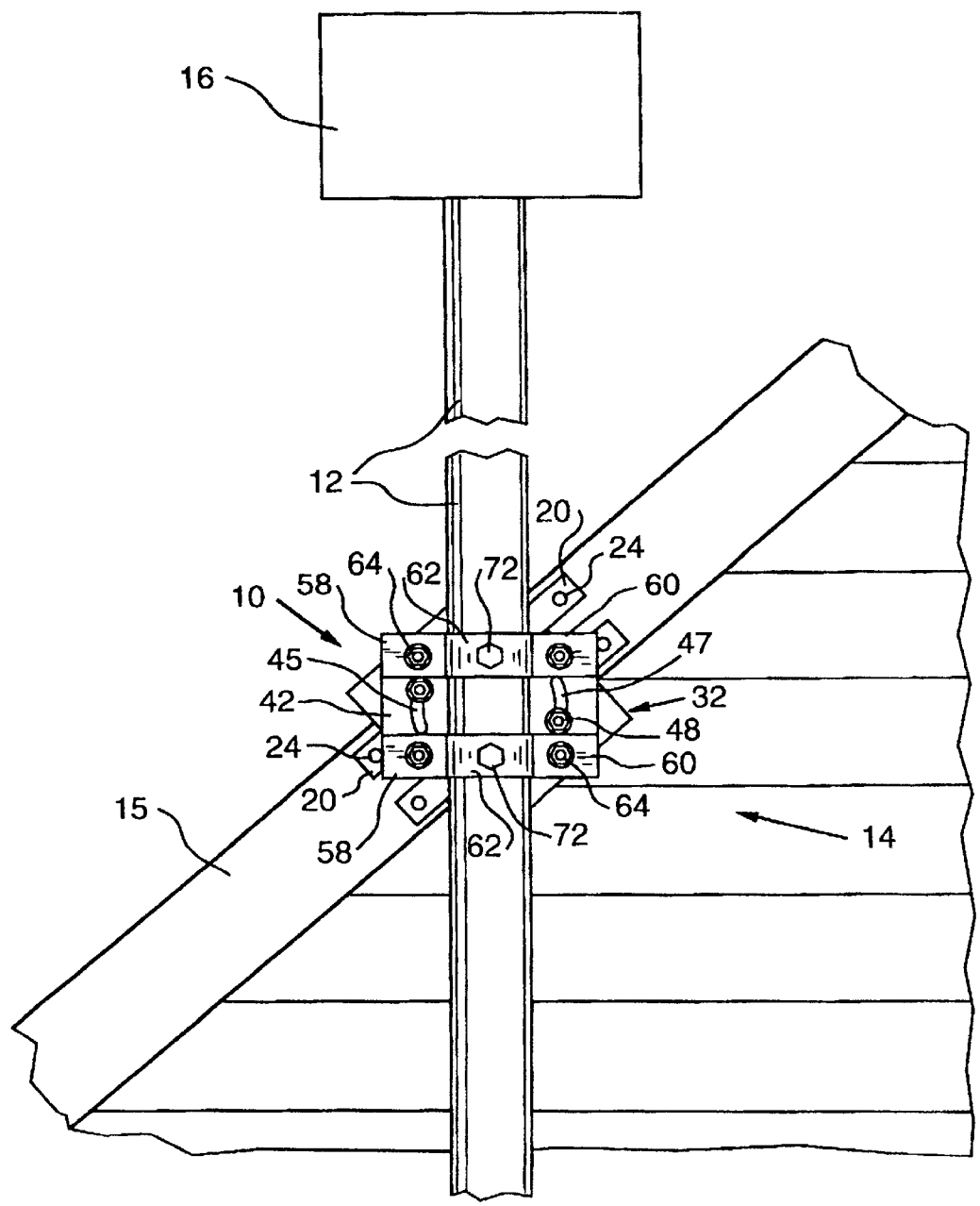
FIG. 1 is a front elevational view illustrating a mounting apparatus of the present invention as attached to a structure.

With reference to FIGS. 1–4C, there is shown an apparatus 10 of the subject invention. With specific reference to FIG. 1, the apparatus 10 is shown mounting a receiver mast 12 to a structure 14. The receiver mast 12 is typically an elongated member constructed of a tubular metal material and having a generally circular cross-section. It should be appreciated, however, that the receiver mast 12 may be constructed in various shapes and of various materials of suitable strength for supporting a receiver 16 mounted to an end of the receiver mast 12. Another end of the receiver mast 12 is mounted to the mounting apparatus 10, as will be described in more detail herein. The structure 14 to which the apparatus 10 is mounted may be, for example, a house (as shown in FIG. 1, and for example an eve 15 thereof), other types of buildings, a pole, a tower or a tree, etc. The apparatus 10 is particularly well suited for placement on a structure 14 that does not have a vertically oriented surface and where adjustment of the receiver mast 12 to obtain a proper orientation of the mast 12 may be necessary following attachment of the apparatus 10 to the structure 14.

Figure 2:
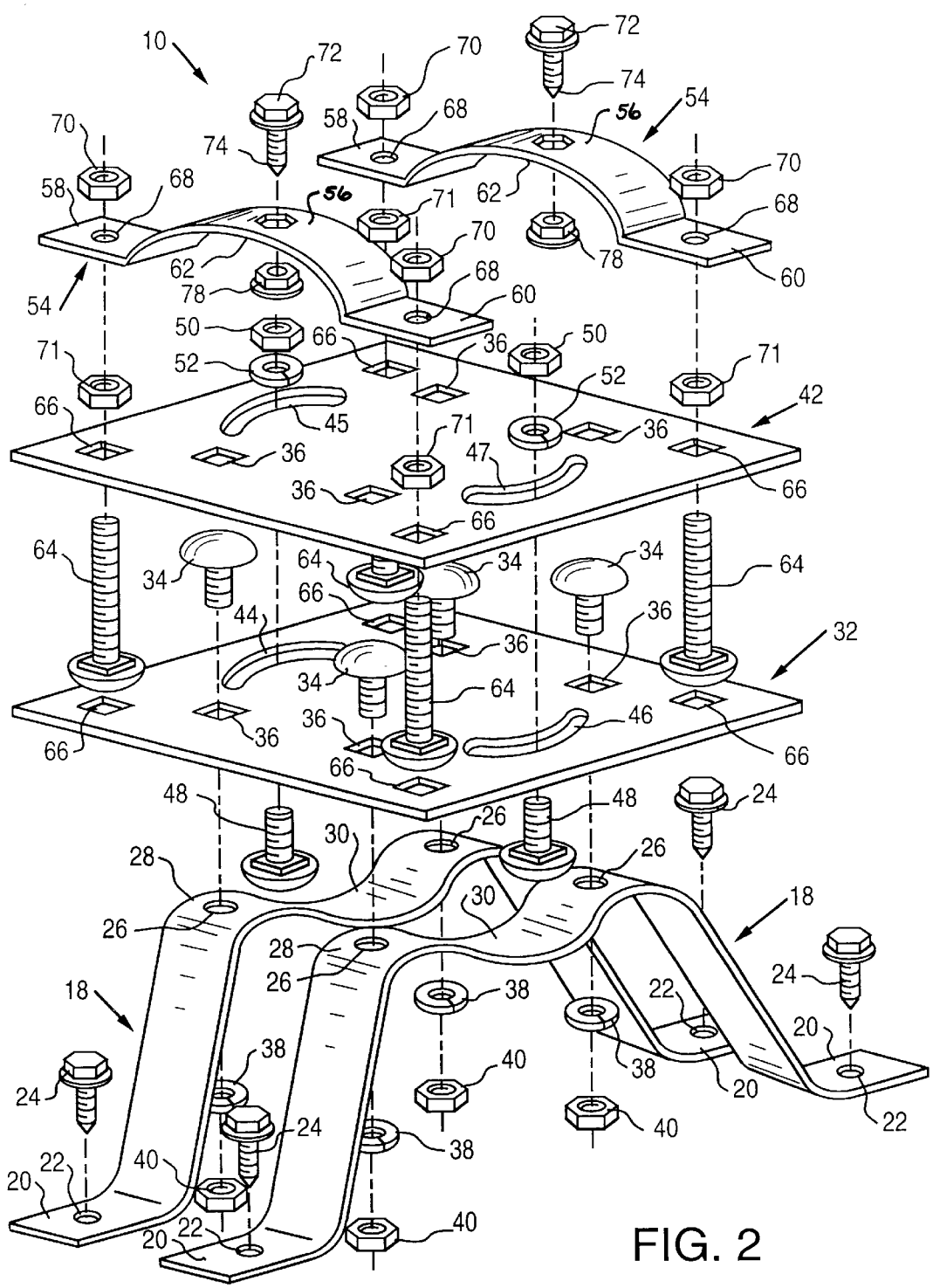
FIG. 2 is an exploded, perspective view of the mounting apparatus shown in FIG. 1.

With reference to FIG. 2, the apparatus lo is shown in more detail. Specifically, the apparatus 10 includes a pair of leg members 18, that are directly attachable to the structure 14. The leg members 18 are essentially identical. Each leg member 18 includes foot portions 20 for direct placement on the structure 14. The foot portions 20 include apertures 22 extending therethrough for receipt of fasteners 24 which may be, for example, wood screws, metal screws, bolts or nails depending upon the composition of the structure 14. Each leg member 18 also includes a pair of apertures 26 that extend through a top portion 28 of the leg members 18. The top portion 28 may contain a bend 30 to increase the rigidity and strength of the leg members 18.

Still referring to FIG. 2, the apparatus 10 also includes a stationary plate 32 (also referred to as a structure attachment plate or stationary structure plate) attached to and supported by the leg members 18. The stationary plate 32 is attached to the leg members 18 by one or more carriage bolts 34. Carriage bolts 34 extend through complimentary holes 36, formed in the stationary plate 32, and through apertures 26 of the leg members 18 for cooperation with washers 38 and nuts 40. As can be seen in FIG. 2, holes 36 may be generally square for cooperating with a similar shaped portion formed on the carriage bolts 34. Those of ordinary skill in the art will appreciate that such an arrangement prevents the rotation of the carriage bolts 34 when their corresponding nuts 40 are screwed thereon. Such arrangement eliminates the need for a separate hand tool to hold the carriage bolt 34 as the nut 40 is screwed thereon. The stationary plate 32 is attached to the leg members 18 such that the stationary plate 32 does not move with respect to the leg members 18.

The apparatus 10 also includes a rotatable or movable plate 42 positioned adjacent to the stationary plate 32. The stationary plate 32 and the movable plate 42 are preferably generally planar plates that are positioned generally parallel to each other. This conveniently allows for movement of the movable plate 42 with respect to the stationary plate 32. It will be appreciated, however, that the stationary plate 32 and movable plate 42 may be shaped and configured, other than as shown and described herein, for relative movement to one another in accordance with the present invention.

The stationary plate 32 defines a first slot 44 and a second slot 46. Similarly, the movable plate 42 defines a primary slot 45 and a secondary slot 47. The slots 44, 45, 46 and 47 are preferably generally arcuate. However, other slot configurations may be successfully employed in accordance with the invention. The slots 44, 45, 46 and 47 each may have an appropriate length and radius to provide for suitable movement of the movable plate 42 with respect to the stationary plate 32, such as, for example movement of the movable plate 42 through an angle of generally 45 degrees (see FIG. 4B) in either direction from alignment with respect to the stationary plate (see FIG. 4A). Of course, movement through an angle greater than or less than 45 degrees may be employed with the invention.

The movable plate 42 is releasably attached or locked to the stationary plate 32 by one or more releasable attachment members, such as, carriage bolts 48 and cooperating nuts 50 and washers 52. More specifically, a carriage bolt 48 extends through the first slot 44 and the primary slot 45 and another carriage bolt 48 extends through the second slot 46 and secondary slot 47. When the nuts 50, are in an untightened position, the movable plate 42 can be moved in varying directions, as will be described in more detail herein, with respect to the stationary plate 32. It will be appreciated that once the nuts 50 are in a tightened position, the movable plate 42 is maintained in a fixed position with respect to the stationary plate 32.

Still referring to FIG. 2, the apparatus 10 also includes one or more mast fasteners, generally designated by reference number 54. The mast fasteners 54 are essentially identical to one another. The mast fasteners 54, provide a means for affixing the receiver mast 12 to the movable plate 42. Each mast fastener 54 includes a strap 56 having a first end 58, a second end 60 and a central portion 62 therebetween. The central portion 62 preferably has a shape that is complimentary to a shape of the receiver mast 12 in order to best accommodate receipt of the receiver mast 12 in the central portion 62. As shown in the drawings, the central portion 62 may have a semi-circular shape to accommodate the receiver mast 12 having a generally circular cross-section.

The mast fasteners 54 are releasably secured to the movable plate 42 by carriage bolts 64 which extend through complimentary holes 66 formed in movable plate 42 and through apertures 68 defined by the first and second ends 58, 60 of each mast fastener 54. Cooperating nuts 70 are provided for tightening and untightening of the mast fastener 54 to the movable plate 42, while cooperating nuts 71 hold the bolts 64 in place while mounting mast 12 to the movable plate 42. Each mast fastener 54 also may include an anti-movement member, such as bolt 72 extending, for example, through the central portion 62 of the strap 56 for engagement with the receiver mast 12 to prevent movement of the receiver mast 12 once received in the strap 56. Specifically, bolt 72 may include a pointed end 74 and extend through an aperture 76 that preferably has a hexagonal shape for receipt of a nut 78. Once the receiver mast 12 is received in the central portion 62 of the strap 56, the bolt 72 is tightened such that the pointed end 74 engages the receiver mast to prevent movement, either lateral and/or rotational motion, of the receiver mast 12 relative to the apparatus 10. It will be appreciated, however, that other anti-movement members, such as, for example, a non-skid rubber material, self-tapping screws, or one or more detents may be provided on the strap 56 for engagement with the receiver mast 12 to resist movement thereof.

Figure 3:
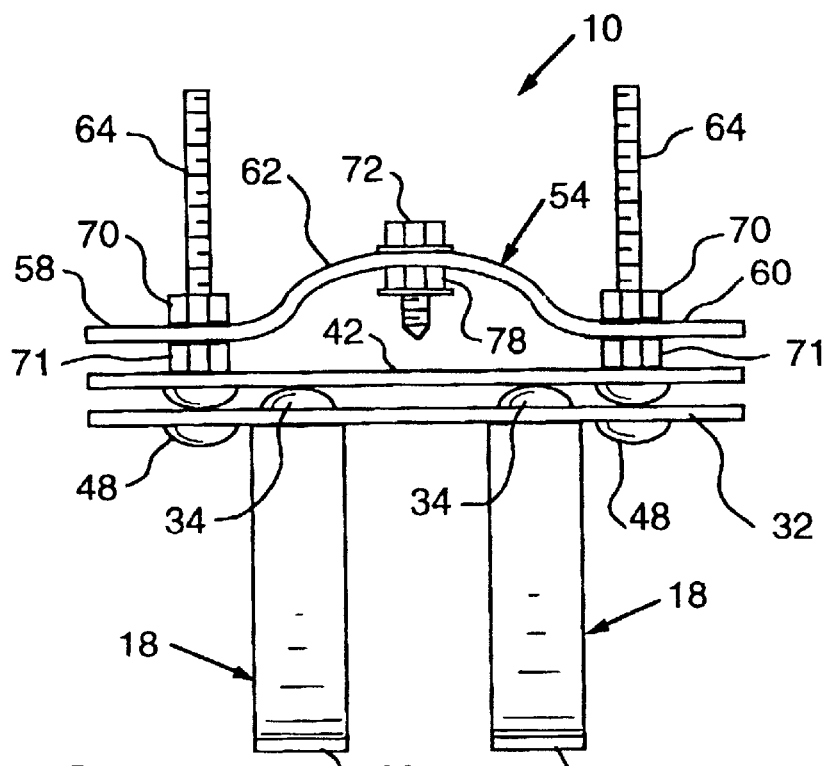
FIG. 3 is a front elevational view of the mounting apparatus of FIGS. 1 and 2, as assembled.

FIG. 3 shows a front elevational view of the apparatus 10 as assembled. As described herein, the stationary plate 32 is securely attached to the leg members 18. The movable plate 42 is releasably attached to the stationary plate 32 and the mast fasteners 54 are releasably attached to the movable plate 42 for receipt of the receiver mast 12.

As shown in FIG. 1, the apparatus 10 may be attached to the structure 14, and more specifically to the eve 15 of the structure 14. As shown, the eve 15 extends at an angle. In order to provide for the most secure attachment of the apparatus 10 to the angled eve 15, it is preferred that the foot portions 20 of the leg members 18 be mounted along a longitudinal axis of the eve 15 using fasteners 24.

Typically, it is necessary th at the receiver mast 12 be positioned with a generally vertical orientation to ensure proper operation of the receiver 16 that is attached thereto. It will be appreciated, however, that in situations where the apparatus 10 is mounted to an angled portion of a structure, such as the eve 15 of the structure 14 as described herein, the need may exist to adjust the apparatus 10 to position the receiver mast 12 in a generally vertical orientation, or other orientation as desired. This need is satisfied by the subject invention, by virtue of the movable plate 42 being movable with respect to the stationary plate 32 to accommodate adjustment and positioning of the receiver mast 12.

Figure 4A:
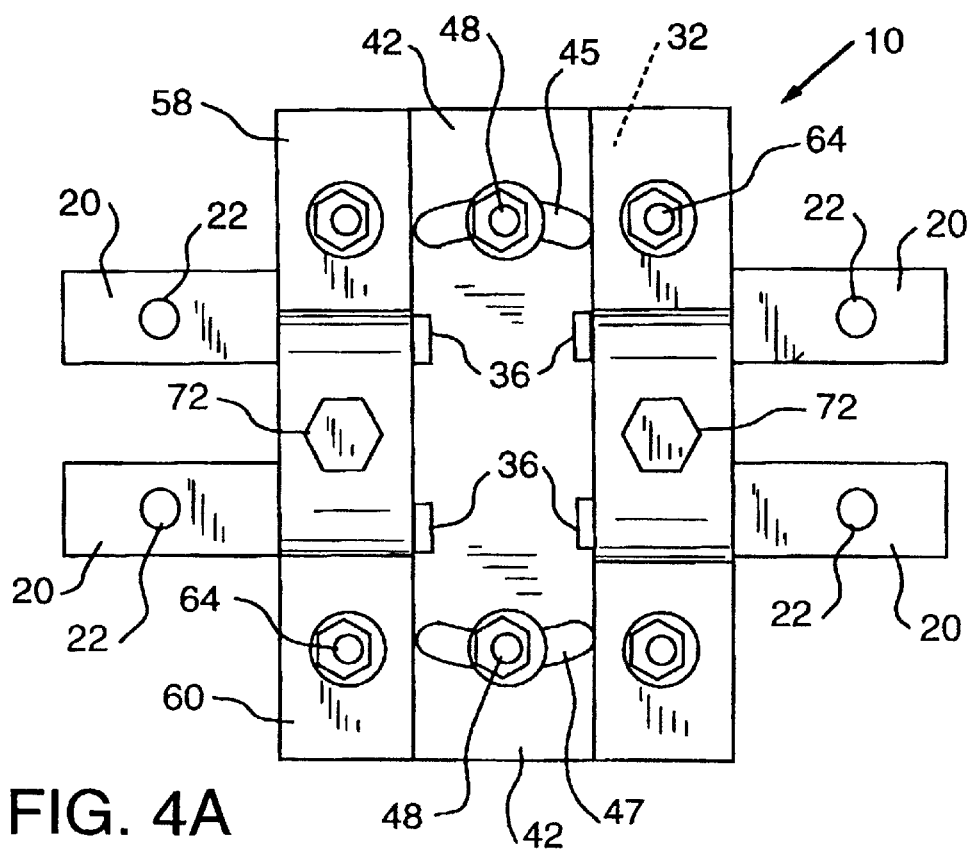
FIGS. 4A–4C are top plan views of the mounting apparatus of FIGS. 1–3 illustrating a movable plate of the apparatus in various positions.
Figure 4B:
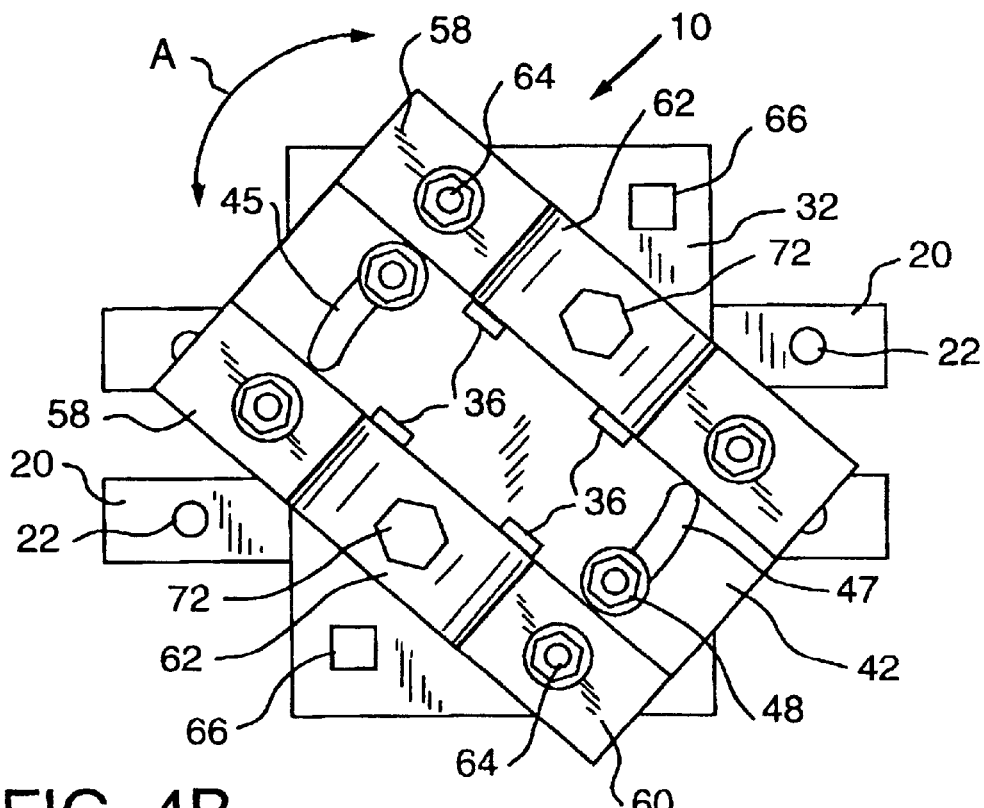
Figure 4C:
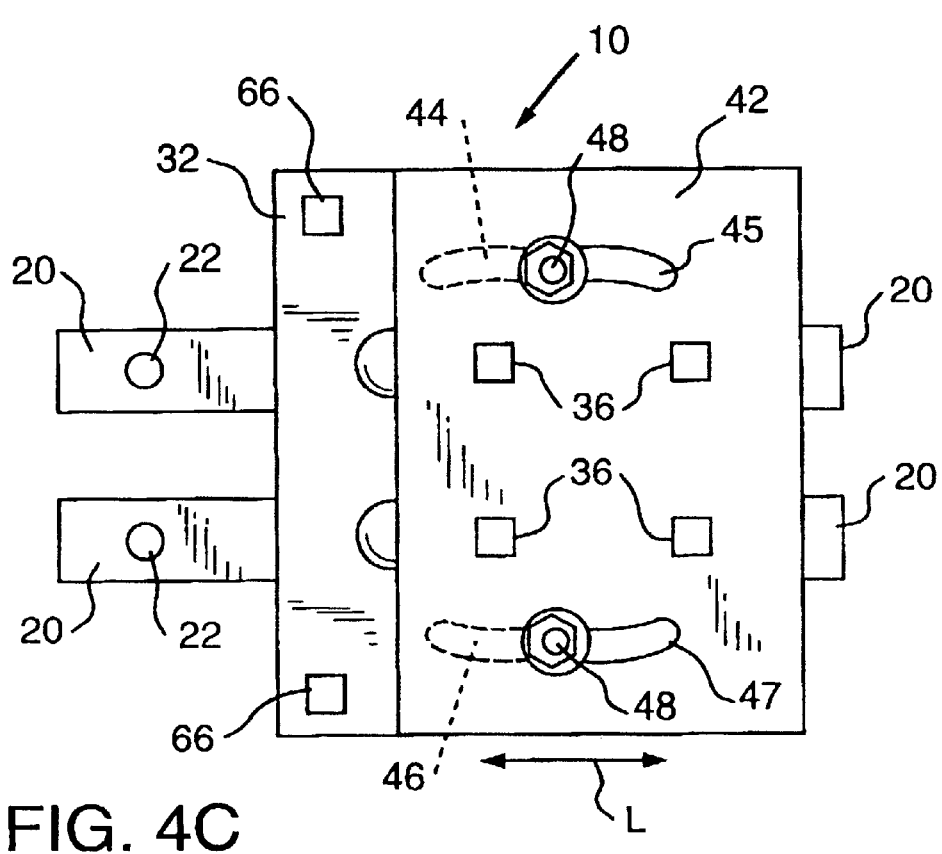

Specifically, with reference to FIGS. 4A–4C, FIG. 4A shows the apparatus 10 with the movable plate 42 directly overlying the stationary plate 32. FIG. 4B illustrates rotatable or angular movement (as designated by arrow A) of movable plate 42 with respect to stationary plate 32. FIG. 4C illustrates lateral movement (as designated by arrow L) of the movable plate 42 with respect to the stationary plate 32. The movement of the movable plate 42 with respect to the stationary plate 32 as shown in FIGS. 4A–4C is facilitated by the releasable attachment member, e.g. carriage bolts 48, which extend through the slots 44, 45 and the slots 46, 47 to releasably attach or lock the movable plate 42 to the stationary plate 32. It will be appreciated that the movable plate 42 is selectively movable with respect to the stationary plate 32 by rotatable movement (FIG. 4B), lateral movement (FIG. 4C) or combinations of rotatable and lateral movement depending upon the positioning of the movable plate 42 that is needed for a given situation.

Once the apparatus 10 is secured to the structure 14, the receiver mast 12 is secured to the movable plate 42 by the mast fasteners 54. Specifically, the receiver mast 12 is positioned in the central portion 62 of the strap 56 and then the nuts 70 and nuts 71 are tightened on the carriage bolts 64 to secure the receiver mast 12 to the movable plate 42. The bolts 72 with pointed end 74 may then be tightened against the receiver mast 12 to further prevent movement of the receiver mast 12.

Prior to securing the movable plate 42 to the stationary plate 32, the movable plate 42 may be moved, either rotatably and/or laterally as described herein, to place the receiver mast 12 in a generally vertical orientation. A carpenter's level or other known instrument may be used to ensure that the receiver mast 12 is in a generally vertical orientation. The movable plate 42 may then be secured to the stationary plate 32 to prevent movement of the movable plate 42 by tightening the nuts 50 on the carriage bolts 48. If additional adjustment of the orientation of the receiver mast 12 is needed after the initial installation, it will be appreciated that such an adjustment may be easily made by loosening the nuts 50 on the carriage bolts 48 to permit the receiver mast 12 to be properly oriented. After the mast 12 is oriented to the desired position, the nuts 50 are retightened.

The components described herein of the apparatus 10 are preferably fabricated of, for example, a galvanized metal to resist corrosion of the apparatus 10 and to provide sufficient strength to support the receiver mast 12 and receiver 16. It will be appreciated, however, that the apparatus 10 may be fabricated from a variety of other materials such as, for example, stainless steel or a polymer material capable of supporting the mast 12 and receiver 16. In addition, the leg members 18 may be fabricated from a selectively bendable material such as, for example, 10 gage metal. The term "selectively bendable" as used herein means that the leg members 18 may be selectively bent to position the same on, for example, uneven surfaces such as a tree to secure the apparatus 10 thereto without compromising the material's structural integrity and without compromising the material's ability to substantially rigidly support the mast 12 relative to the structure.

It will be appreciated that the apparatus 10 is constructed to simplify manufacturing, assembly and installation thereof. For example, it will be appreciated that the stationary plate 32 and the movable plate 42 are constructed essentially identical to one another. This allows for the plates to be interchangeable. In addition, carriage bolts are used in association with complimentary holes formed in the stationary plate 32 and movable plate 42 for ease of assembly and installation. It will be further appreciated that the carriage bolts 64 for attaching the mast fasteners 54 to the movable plate 42, as well as the carriage bolts 48 which releasably attach the movable plate 42 to the stationary plate 32, protrude outwardly from the apparatus 10 to allow for easy access to the respective nuts 70 and 50 (the other end of the carriage bolts 64 and 48 being received in the complimentary holes, as described herein).

Figure 5:
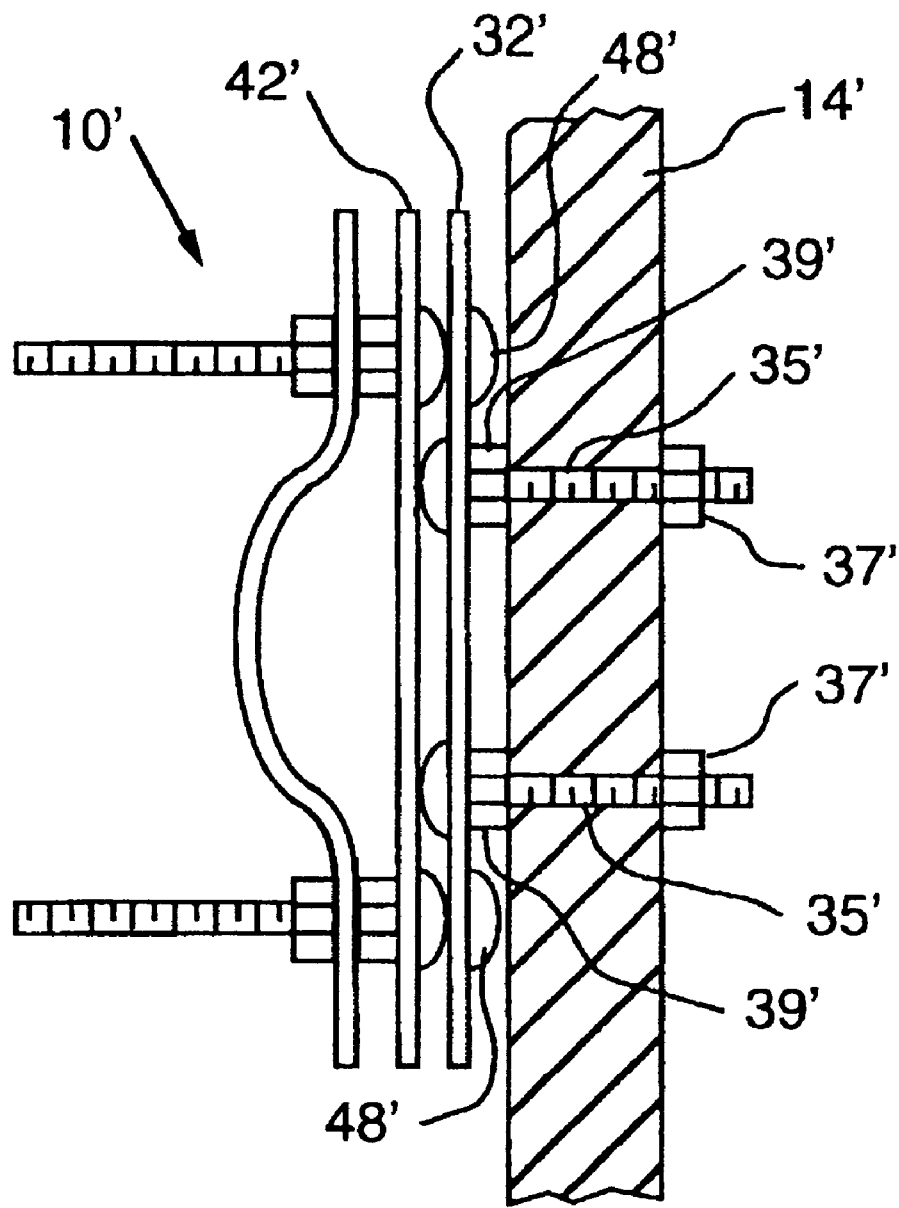
FIG. 5 is an alternate embodiment of the mounting apparatus of the invention.

Referring to FIG. 5, there is shown an alternate embodiment of an apparatus 10' that is directly attached to a structure 14' without employing leg members similar to leg members 18, of the previous embodiment described herein. The apparatus 10' is-constructed essentially as the apparatus 10, as described herein, only the carriage bolts 34' are directly attached to structure 14' by cooperating nuts 37'. Additional nuts 39' positioned between the stationary structure plate 32' and the structure 14' may be necessary to ensure that the movable plate 42' remains movable with respect to the stationary plate 32'. Other suitable spacers may be utilized in place of the nuts 39' to provide the necessary clearance. The skilled artisan will appreciate, however, that other appropriate forms of fastener members may be employed to affix the stationary plate 32' to the support structure 14'.

Whereas particular embodiments of the invention have been described herein for purpose of illustration, it will be appreciated by those skilled in the art that numerous variations of the details may be made without departing from the invention as described in the appended claims.

What is claimed is:

1. An apparatus for mounting a receiver mast to a structure, the apparatus comprising:
   a planar structure attachment plate having a first elongated slot therethrough;
   a planar movable plate having a primary elongated slot therethrough;
   a releasable attachment member extending through said first elongated slot and said primary elongated slot, said releasable attachment member having a tightened position wherein said planar movable plate is non-movably affixed to said structure attachment plate and a loosened position wherein said planar movable plate is free to move laterally and rotationally relative to said planar structure attachment plate while remaining coupled thereto and wherein said releasable attachment member is free to move laterally within each of said first and primary elongated slots when in said loosened position;
   an additional releasable attachment member that is received in a second elongated slot defined by said structure attachment plate and in a secondary elongated slot defined by said moveable plate; and
   a mast fastener for affixing the receiver mast to said movable plate.

2. The apparatus of claim 1, wherein said first elongated slot of said structure attachment plate and said primary elongated slot of said movable plate are generally arcuate.

3. The apparatus of claim 1, wherein said second elongated slot of said structure attachment plate and said secondary elongated slot of said movable plate are generally arcuate.

4. The apparatus of claim 1, wherein said structure attachment plate is positioned generally parallel to said movable plate.

5. The apparatus of claim 1, wherein said mast fastener includes a strap having a first end, a second end, and a central portion therebetween, said central portion having a shape complimentary to a shape of the receiver mast.

6. The apparatus of claim 5, wherein said mast fastener further includes an anti-movement member for engagement with the receiver mast to prevent movement of the receiver mast.

7. The apparatus of claim 6, wherein said anti-movement member includes a bolt extending through an aperture defined by said central portion of said strap, said bolt cooperating with a nut for tightening thereof, said bolt having a pointed end for engagement with the receiver mast to prevent movement thereof.

8. The apparatus of claim 1, wherein said receiver mast is affixed to said movable plate with the receiver mast in a generally vertical orientation.

9. The apparatus of claim 1, further including a leg member attachable to the structure and the structure attachment plate.

10. The apparatus of claim 1, wherein said structure attachment plate includes an upper planar surface positioned adjacent a lower planar surface of said movable plate.

11. An assembly mounted to a structure for receiving a signal, the assembly comprising:
    a signal receiver;
    an elongated mast having one end attached to said signal receiver; and
    a mounting apparatus for attaching to another end of said elongated mast, said mounting apparatus comprising:
      a planar structure attachment plate defining an elongated first slot and an elongated second slot;
      a movable plate having an elongated primary slot and an elongated secondary slot therethrough;
      a releasable attachment member extending through said first elongated slot and said primary elongated slot and another releasable attachment member extending through said second and secondary slot, said releasable attachment member and said another releasable attachment member each having a tightened position wherein said planar movable plate is non-movably affixed to said structure attachment plate and a loosened position wherein said planar movable plate is free to move laterally and rotationally relative to said planar structure attachment plate while remaining coupled thereto and wherein said releasable attachment member is free to move laterally within each of said first and primary elongated slots when in said loosened position and said other releasable attachment member is free to move laterally within each of said second and secondary slots when in said loosened position; and
      a mast fastener for affixing said elongated mast to said movable plate.

12. The apparatus of claim 11, wherein said first slot of said structure attachment plate and said primary slot of said movable plate are generally arcuate.

13. The apparatus of claim 11, wherein said second slot of said structure attachment plate and said secondary slot of said movable plate are generally arcuate.

14. The apparatus of claim 11, wherein said structure attachment plate is positioned generally parallel to said movable plate.

15. The apparatus of claim 11, wherein said mast fastener includes a strap having a first end, a second end, and a central portion therebetween, said central portion having a shape complimentary to a shape of said elongated mast.

16. The apparatus of claim 15, wherein said mast fastener further includes an anti-movement member attached to said moveable plate for engagement with said elongated mast to prevent movement of said elongated mast relative to said moveable plate.

17. The apparatus of claim 16, wherein said anti-movement member includes a bolt extending through an aperture defined by said central portion of said strap, said bolt cooperating with a nut for tightening thereof, said bolt having a pointed end for engagement with said elongated mast to prevent movement thereof.

18. The apparatus of claim 11, wherein said elongated mast is affixed to said movable plate with the elongated mast in a generally vertical orientation.

19. The apparatus of claim 11, further including a leg member attachable to the structure and the structure attachment plate.

20. The apparatus of claim 11, wherein said structure attachment plate includes an upper planar surface positioned adjacent a lower planar surface of said movable plate.

* * * * *